April 5, 1960 U. POHJOLA 2,931,731
BABY FOOD FORMULA PACKAGE
Filed Aug. 17, 1956

INVENTOR.
UNO POHJOLA
BY
ATTORNEY.

United States Patent Office

2,931,731
Patented Apr. 5, 1960

2,931,731

BABY FOOD FORMULA PACKAGE

Uno Pohjola, Southfield Township, Oakland County, Mich.

Application August 17, 1956, Serial No. 604,776

4 Claims. (Cl. 99—171)

This invention relates to baby nursing and more particularly to an improved method of preparing baby food formula for canning, and a container for canning baby food formula prepared in accordance with such improved method.

It is commonly appreciated that feeding babies by breast has virtually disappeared in this country and usually continues only for a few days after birth, medical opinion being to the effect that while various immunities received by the baby with mother's milk are very beneficial for the baby during the first few days of its life, there is no particular advantage in continuing breast feeding for more than a few days. Therefore, immediately after birth or shortly thereafter, babies are transferred to feeding on cow milk diluted by water and sweetened, which is usually referred to as "formula." Such a mixture is prepared to conform as closely as possible to the contents of human milk. Cow milk is almost twice as rich as human milk in its fat content and does not contain enough of milk sugar or lactose. Therefore, preparation of baby food formula includes primarily diluting cow milk with water and adding sugar, preferably dextrose, to bring the sugar content of the mixture to that of human milk.

An important part of the procedure of preparation of baby food formula consists in sterilizing the ingredients or mixture by boiling, whereupon sterilized formula is poured into bottles. Thereupon, nipples are placed on such bottles and the bottles are placed into a refrigerator to be ready for use. For use, a bottle is placed in warm water until the contents are heated to the temperature that is considered by feel to be correct, whereupon the bottle is ready for the baby.

Difficulties and dangers in the preparation of baby food formula may be found both in the milk as well as in the water ingredients thereof, and in the process of preparing the formula. For instance, unless the milk is pasteurized, various cow diseases may be communicated to babies through such milk. Also, city water is usually treated with chemicals, and while being safe for adults and most children, it may cause serious stomach disorders in particularly sensitive babies.

Accordingly, condensed canned milk is often used for preparation of baby food formula, ensuring that the latest safety measures with respect to pasteurizing and treating the milk can be done in a well equipped establishment where the volume of such operations justifies installation of necessary equipment. Availablity of condensed canned milk for preparing baby food formula has proved to be of great benefit in many localities and in many situations where the supply of properly pasteurized milk is inadequate.

Attempts have also been made to eliminate the second source of danger in the preparation of baby food formula, namely, in the water content thereof, by using distilled or spring water. Accordingly, it has been proposed that baby food formula should be completely prepared in a canning plant under strictly controlled conditions. It has been found, however, that keeping qualities of such complete formula or the "shelf life" of such baby food formula cans is greatly decreased as compared to that of the condensed canned milk. It is believed that certain processes and changes take place in the formula after the same is mixed. Therefore, a rigid system of dating such cans may be necessary in order to prevent an overaged can to be fed to a baby, perhaps endangering its life. While a number of containers for canning baby food formula have been devised, none of them has yet received universal or appreciably wide use.

The efforts to produce cannable baby food formula have also been prompted by the fact that preparation of easily digestible and safe baby food formula requires considerable equipment and space in which to work, even in an individual home, namely, space for washing and a stove for sterilizing baby bottles and nipples; space and equipment to sterilize the ingredients, mix the formula, pour it into bottles, and to keep the bottles refrigerated in order to ensure that the formula will remain in proper condition for several days. In fact, even preserving prepared baby food formula for that period of time and bringing it to the temperature suitable for feeding also requires considerable space and equipment. To appreciate these difficulties one only has to observe a mother trying to feed a baby in a coach train or in a railroad station. During various emergencies, such as floods, tornadoes, conditions of war, all of these difficulties are amplified manyfold and are responsible for many baby sicknesses and increased infant mortality.

One of the objects of the present invention is to provide an improved method for canning baby food formula and a container therefor whereby the above difficulties and disadvantages are overcome and largely eliminated without introducing any new or additional problems.

Another object of the present invention is to provide a container for canning baby food formula, the "shelf life" of which is equal to that of the condensed canned milk.

A further object of the present invention is to provide an improved method of producing cannable baby food formula, in which the dangers to digestive properties of the formula attributable to milk, water, and to the process of preparing the formula are decreased and virtually eliminated, and whereby a formula to be prepared from properly sterilized milk of proper quality, of especially treated or prepared water, such as distilled water, or spring water, can be mixed shortly before feeding, ensuring that no changes in the formula, which may occur or begin developing after the above ingredients are mixed, will actually occur.

A still further object of the present invention is to provide an improved container with the aid of which a baby food formula is mixed in a container provided with a nipple and without the necessity of preliminary sterilization of the ingredients or washing of the bottles and nipples, thus eliminating the difficulties and inconvenience resulting therefrom.

A still further object of the present invention is to provide an improved container for baby food formula, a number of which containers can be kept at a proper temperature for a considerable length of time, such as one entire day, without the necessity of heating such containers or bottles from refrigerated temperature, thus ensuring safe feeding of babies under emergency conditions such as while traveling, during natural disasters, in air raid shelters, and under similar emergency conditions.

A still further object of the present invention is to provide an improved container for baby food formula, which is safe and dependable in use and is relatively inexpensive to manufacture, thus justifying its disposal without washing.

Further objects and advantages of this invention will be apparent from the following description and appended claims, reference being had to the accompanying drawings forming a part of this specification, wherein like reference characters designate corresponding parts in the several views.

Figure 1:
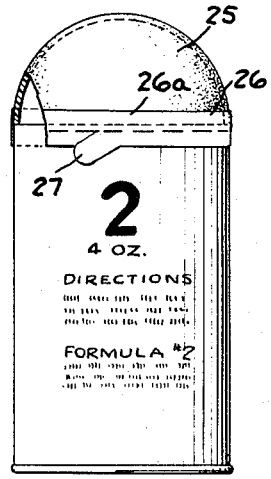
Fig. 1 is an elevational view of my improved baby food formula container.
Figure 2:
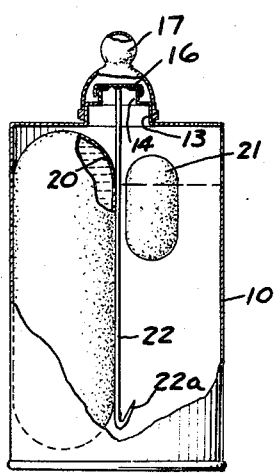
Fig. 2 is a view similar in part to Fig. 1 with the portion of the container broken away to expose its interior construction.
Figure 5:
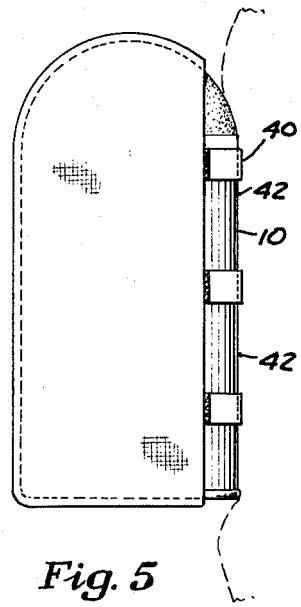
Fig. 5 is a side view on one of the containers held in the belt pocket.
Figure 3:
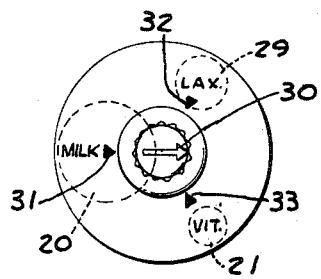
Fig. 3 is a top view of the container with its cover being removed.
Figure 4:
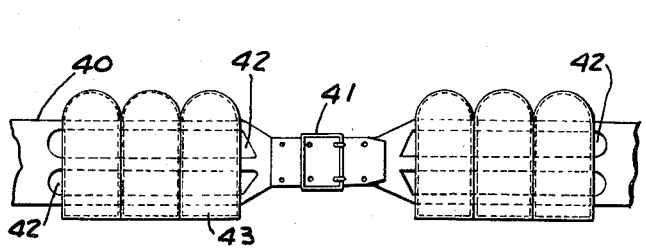
Fig. 4 is an elevational view of a belt for wearing a number of containers such as shown in Fig. 1 in order to have them ready in emergency and to utilize body heat of the wearer for keeping the containers warm.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention, I provide a container for baby food formula in which the ingredients thereof and particularly condensed milk and sweetened water are held separately in sealed containers and are mixed only immediately before use. Thus the "shelf life" of the contents is greatly increased and is limited only by the "shelf life" of the separate ingredients and particularly by that of the evaporated milk and of the sweetened water.

I also provide a belt with the use of which a number of containers may be worn by a mother and kept warm by body heat. Thus, since the containers are generally at room temperature, they need not be heated before being put into the belt. I also provide an improved tool for opening sealing caps of the containers and for cleaning holes in the nipples, as well as for performing other useful operations.

In the drawings there is shown, by way of example, my improved container for baby food formula, embodying the present invention. Referring specifically to the drawings, my improved container comprises the main container 10 which may be made in the form of and by a process similar to cans for canning food and of materials suitable for such purpose, such, for instance, as tinned steel. At the top of the container 10 there is provided a collar or throat having a wider diameter portion 13 and a narrow diameter portion 14 having an opening 15. The opening 15 is adapted to be closed with a sealing or pressure cap 16 which may be crimped to seize the edges of the portion 14 is a manner well known in the art. The portion 13 is adapted to receive a nipple 17 which is made preferably from a plastic material and, therefore, at low cost, making it suitable for discarding after the feeding.

Within the main container 10 there is provided a capsule or blister 20 in which there is sealed a quantity of evaporated milk sufficient for one feeding. Additional capsules or blisters 21 and 29 have sealed therein a number of additives such as vitamins or laxatives that may need to be added to the formula. The main container 10 holds a quantity of water sweetened with sugar such as dextrose. The capsules 20, 21 and 29 are puncturable or rupturable. Such property may be effected by making capsules of a suitable plastic material. Their puncturing or rupturing is effected with the aid of a hook 22 secured to the underside of the sealing cap 16. A plastic cover cap 25 is provided, and it fits over the top of the main container and is connected thereto with the aid of a plastic band 26 having a finger tab 27 and perforations 26a. Because of such a construction, for removing the cap, the band 26 is stripped off from the cap 25 merely by taking hold of the tab 27 and stripping it off.

In use, a container is removed from a pocket in the belt and the strip 27 is removed as explained above, whereupon the cap 25 is taken off. This cap itself may be used for such purposes as mixing cereal with formula milk. The cap is discarded after use, or immediately after taking off, if not needed. Thereupon the nipple 17 is taken off and the sealing cap 16 is removed with the aid of the tool shown in Figs. 6 and 7 or any other suitable tool. Thereupon the cap is turned to have the arrow 30, which is marked on its upper surface, register with the arrow 31 pointing to the location of the milk capsule. The capsule is then torn or punctured with the aid of the sharp hook end 22a, which contacts the capsule when the cap is turned. If other capsules are provided in the container, as in the present embodiment, the arrow 30 is moved to register with the respective arrows 32 and 33 for puncturing such capsules. Thereupon, the cap with the hook is removed and discarded, the nipple 17 is replaced and the contents are thoroughly mixed by shaking. The container is now ready for feeding.

After the baby is fed, the entire container and the nipple are discarded, thus eliminating any necessity of washing and sterilizing them.

The exact proportioning of the ingredients for the formula may vary depending on the digestive requirements of babies and their respective ages, and may be designated by corresponding legend printed or otherwise provided on the outside of the container as indicated in Fig. 1.

By virtue of such an expedient the precise proportioning of the formula and use of the best ingredients are ensured, eliminating difficulties explained above.

The belt used for carrying the containers may be in the form of relatively wide belt made of leather, plastic or fabric. The main body of the belt designated by the numeral 40 is provided with a buckle 41. Length adjustment buckles may also be provided on the belt, if desired. Recesses 42 are provided in the belt near the buckle to permit better contact of the cans with the body of the wearer, thus ensuring better transfer of heat by conductivity. A plurality of pockets such as 43 is provided on the belt at its recessed portions and are preferably made of elastic material in order to ensure that the containers are held tightly on the belt.

Figure 6:
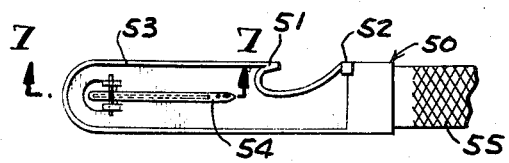
Fig. 6 is a tool for opening sealing caps of the containers and cleaning the hole in the nipple.
Figure 7:
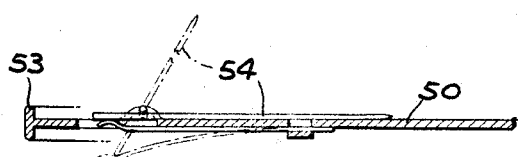
Fig. 7 is a top view of the construction of Fig. 6.

The tool for removing the pressure cap 16 is illustrated in Fig. 6. The tool is generally designated by the numeral 50, and is provided with a hook 51 and a balancer or a heel portion 52. Beads 53 are provided around the edges of the portion of the tool to increase its strength as well as the contact area thereof with the cap. Within the bead protected portion of the tool there is provided a spring-pressed needle 54 retractable into the groove within the tool but extendable as shown in Fig. 7 for cleaning the hole in the nipple. To this tool there may also be added an additional utility portion such as a nail file portion 55, thus eliminating the necessity of carrying a separate nail file or a similar tool.

By virtue of the above disclosed construction, the objects of the present invention listed above and numerous additional advantages are attained.

I claim:

1. A container-mixer for baby food formula ingredients, comprising an upright cylindrical can made of tinned sheet steel and having a throat at its top having a top opening, said can forming a sealed compartment holding a quantity of sweetened water sufficient for making up baby formula for one feeding, a sealed rupturable blister disposed within said can and holding a quantity of condensed milk corresponding to the quantity of sweetened water for proper composition of the formula, a removable pressure cap provided on said throat to close sealingly the opening thereof, an elongated member secured to said cap at the underside thereof and extending therefrom downwardly into the can and having provided thereon a sharp end adapted to be used for manually rupturing said blister after the pressure cap carrying said member is removed from the can throat, a sterilized nipple removably fitted over said throat to cover said pressure cap, said nipple being adapted to be removed from the can throat for removal of the cap and rupturing of the blister and to be replaced over said throat, after the pressure cap is removed and the blister ruptured, for covering the can during mixing said ingredients of the formula in the can and for dispensing the mixed contents to a baby directly from said can, and a removable cover sealingly fitted over the top of said can to preserve the nipple in its sterilized condition.

2. A device functioning as a container-mixer for baby formula ingredients and serving also as a baby feeding bottle, said device comprising an upright cylindrical can made of tinned sheet steel and having at its top a cylindrical throat of two diameters with the throat portions of a smaller diameter being at the top of the portion having the larger diameter, said portion of the smaller diameter having a top opening, the can forming a sealed compartment holding a quantity of sweetened water sufficient for making up baby formula for only one feeding, a sealed rupturable blister disposed within said can and holding a quantity of condensed milk corresponding to the quantity of sweetened water for proper composition of the formula, removable pressure cap provided on the smaller diameter portion of said throat to close sealingly the opening thereof and thus to seal the can, an elongated hook member secured to said cap at the underside thereof and extending therefrom downwardly into the can and adapted to be used for manually rupturing said blister when the cap carrying said member is removed from the can throat, a sterilized nipple removably fitted over the larger diameter portion of said throat to cover said pressure cap, said nipple being adapted to be removed from the can throat for removal of the cap and rupturing of the blister and to be again placed over said throat after the pressure cap is removed and the blister ruptured for mixing said ingredients of the formula and dispensing the mixed contents to a baby directly from the steel can, and a cup-shaped cover sealingly fitted in an upside down position over said steel can to cover said nipple and to preserve the same in a sterilized condition.

3. The device defined in claim 1, the sealing of said cup-shaped cover at the top of said container being attained with a sealing strip covering the edges of said cover and the top edges of the can, said sealing strip including a tab for providing a finger hold for pulling the strip to break the seal and to remove said cup-shaped cover, and with said cup-shaped cover being adapted to be used as a dish for precooked baby cereals requiring the addition of formula from the can.

4. The device defined in claim 2 and including at least one additional puncturable capsule containing a medicinal additive for the food formula, with the blister-puncturing member being in the form of a hook directed upwardly and the sealing cap having a hook-locating marking with capsule-locating markings being provided on the container adjacent said cap.

References Cited in the file of this patent

UNITED STATES PATENTS

| | | |
|---|---|---|
| 1,453,956 | Smith | May 1, 1923 |
| 1,899,203 | Labreche | Feb. 28, 1933 |
| 2,073,273 | Wetstein | Mar. 9, 1937 |
| 2,533,806 | Holzapfel | Dec. 12, 1950 |
| 2,548,080 | Thorn | Apr. 10, 1951 |
| 2,628,911 | Horan | Feb. 17, 1953 |
| 2,721,552 | Nosik | Oct. 25, 1955 |
| 2,731,965 | Haralson | Jan. 24, 1956 |
| 2,741,559 | Banowitz | Apr. 10, 1956 |
| 2,752,036 | Parkhurst | June 26, 1956 |
| 2,753,990 | Chalfin et al. | July 10, 1956 |
| 2,765,109 | Barnett | Oct. 2, 1956 |
| 2,773,591 | Jensen | Dec. 11, 1956 |
| 2,786,769 | Greenspan | Mar. 26, 1957 |
| 2,793,776 | Lipari | May 28, 1957 |

FOREIGN PATENTS

| | | |
|---|---|---|
| 1,003,787 | France | Nov. 21, 1951 |